United States Patent
Chang

(10) Patent No.: US 6,765,693 B1
(45) Date of Patent: Jul. 20, 2004

(54) PHOTO QUALITY COLOR PRINTING BY USING LIGHT BLACK INK

(75) Inventor: Chingwei Chang, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/527,887

(22) Filed: Mar. 20, 2000

(51) Int. Cl.$^7$ .......................... G06K 15/02; G06F 15/00
(52) U.S. Cl. ...................... 358/1.9; 358/3.01; 358/3.02; 347/15; 347/43
(58) Field of Search ................... 358/1.9, 3.01, 358/3.02; 347/15, 43, 18

(56) References Cited

U.S. PATENT DOCUMENTS

| | | | |
|---|---|---|---|
| 4,713,746 A | 12/1987 | Watanabe et al. | |
| 4,860,026 A | 8/1989 | Matsumoto et al. | |
| 4,930,018 A | 5/1990 | Chan et al. | |
| 5,142,374 A | 8/1992 | Tajika et al. | |
| 5,386,305 A | 1/1995 | Usami | |
| 5,402,245 A | * 3/1995 | Motta et al. | 358/1.9 |
| 5,648,801 A | 7/1997 | Beardsley et al. | |
| 5,734,800 A | 3/1998 | Herbert et al. | |
| 5,767,876 A | 6/1998 | Koike et al. | |
| 5,795,082 A | 8/1998 | Shimada et al. | |
| 5,805,178 A | 9/1998 | Silverbrook et al. | |
| 5,982,993 A | * 11/1999 | Slade | 358/1.9 |
| 6,158,836 A | * 12/2000 | Iwasaki et al. | 347/15 |
| 6,172,692 B1 | * 1/2001 | Huang et al. | 347/43 |
| 6,264,300 B1 | * 7/2001 | Warner | 347/18 |
| 6,270,181 B1 | * 8/2001 | Ota | 358/3.02 |
| 6,439,682 B1 | * 8/2002 | Kakutani | 347/15 |

* cited by examiner

Primary Examiner—Edward Coles
Assistant Examiner—Timothy J. Stephany
(74) Attorney, Agent, or Firm—Marger Johnson & McCollom, PC

(57) ABSTRACT

A method for printing images using light black ink. The method sets a first and second threshold determined by an intensity value of the light black ink relative to standard black ink. The method then determines a gray component density value for a pixel, calculates a black generation value based upon the first and second thresholds and then generates values for other colors dependent upon the black generation value.

6 Claims, 1 Drawing Sheet

PHOTO QUALITY COLOR PRINTING BY USING LIGHT BLACK INK

BACKGROUND OF THE INVENTION

1. Field of the Invention

This invention relates to color printing, more particularly to producing high quality printed images using light black ink.

2. Background of the Invention

Color printing typically uses cyan, magenta, yellow and black (CMYK) inks or toners to produce full-color printed images. The term ink is defined to include toners, inks and any other color delivering solution in a printer system. Printed images are formed from dots of these colors in a combination determined by the desired color to be printed. However, at lower resolution such as 600 dots per inch (dpi), the black dots become very noticeable. The resulting images appear grainy, especially when the black ink used inkjet pigment black ink. This particular ink is a different material than the dye-based CMY inks used.

Several different solutions to this problem have been proposed. Two common approaches are to print using CMY with no K or to modulate the black generation such that when there is high luminance there is less black. In the first of these approaches, the necessary amounts of black are achieved by layering the CMY dots. These methods have been in use for a long time.

There are several examples of lesser-used procedures. However, they encompass two main ideas. The first is to control the density of the dots of ink in a given region of the printed image. The second controls the color of the ink or inks used.

Examples of the first approach can be found in U.S. Pat. Nos. 4,713,746 ('746); 4,930,018 ('018); 5,386,305 ('305); and 5,648,801 ('801). In the '746 patent, for example, the picture elements or pixels are restricted to be under 70% of the total area of the picture. This reduces the roughness of the image. A similar technique is used in the '305 patent by classifying areas as intermediate and high density and controlling the amount of black in that area.

Other approaches, such as that found in the '018 patent, the gray scale ink drop count and associated dye loading of the ink are tightly controlled to maximize the uniform distribution of the ink on the printed media.

Yet another approach, found in the '801 patent, scans the incoming image several times. This produces several bit maps that are then handled as if they were part of a multicolor image. The image is then printed with a print head for each optical density bitmap, thereby controlling the densities of the print dots.

The second type of approach controls the ink concentration or density itself. Examples can be found in U.S. Pat. Nos. 4,860,026 ('026); 5,767,876 ('876); 5,142,374 ('374); 5,795,082 ('082); 5,734,800 ('800); and 5,805,178 ('178). For example, the '026 patent uses two different concentrations of ink. Each pixel of the printed image is made up of several dots. The dots could be from the high concentration ink, the low concentration ink, or a combination of both. A similar technique is used in the '876 patent.

In another approach found in the '374 patent the generated data for dark ink is converted into a binary signal and used to reproduce the resolution. The generated data for the light ink is converted into a separate signal, used to reproduce gradient. These two signals and the control of the discharge of both inks is used to record the image. A similar method is used with regards to a dark ink looked up from a table in the '082 patent.

Some techniques use what is referred to as six-color printing. The technique of the '800 patent uses two inks of cyan, two of magenta, yellow and one black, often referred to in short-hand version as CC'MM'YK. One technique uses six-color printing with at least of the three inks having a fluorescent response. The use of the fluorescent response of the inks the image is smoothed out to avoid graininess.

In the '178 patent, the range of pixel intensities are divided into three bands. Cyan and magenta are halftoned, with four levels per pixel. In the darkest band, the darker ink is always present and the lighter is halftoned. In the intermediate band is halftoned between the light ink and the darker ink. The light bank uses only halftoned light ink. However, it must be noted that only light inks are used for the colors of CMY. There are no examples in the art of using light ink for black.

Both types of solutions have problems. The methods that modulate the generation of black dots in the image regions use dark ink and cannot remove the noticeable black dots. The methods using two ink concentrations do not use light black. The methods that avoid the use of black, using a combination of C M and Y to generate black, but degrades the color gamut.

No solution exists that suggests the use of only one black ink, where that black ink is light ink.

SUMMARY OF THE INVENTION

One aspect of the invention is using light black ink to render color images in a printing system. The use of light black ink requires a different method to produce black generation values. The method uses two thresholds, where the value of the thresholds depends upon the density of the light black ink used. The first threshold is approximately where the cyan, magenta and yellow inks will begin to combine with black ink to produce black in the printed image. The second threshold is the point on a gray component density curve where the absolute value of black ink becomes a constant. The method determines a black generation value using these thresholds. Once the black generation value is determined, the other color values are adjusted to account for the black generation value.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Color printers use a technique referred to as black generation to produce values for the cyan-magenta-yellow-black (CMYK) inks for any given gray level. Note that the term ink is used to include inks and toners. For example, if black generation were at 100%, or maximum black, the following values would result:

| C: | 50 | M: | 25 | Y: | 10,prior to removal; |
| C: | 40 | M: | 15 | Y: | 0 | K: | 10. |

For black generation at a 50% level, the following values would result:

| C: | 50 | M: | 25 | Y: | 10,prior to removal; |
| C: | 45 | M: | 20 | Y: | 5 | K: | 5. |

In this manner, black is set equal to a percentage of the lowest CMY value, that value is reduced by the black value, and that amount is subtracted from the remaining colors.

Figure 1:
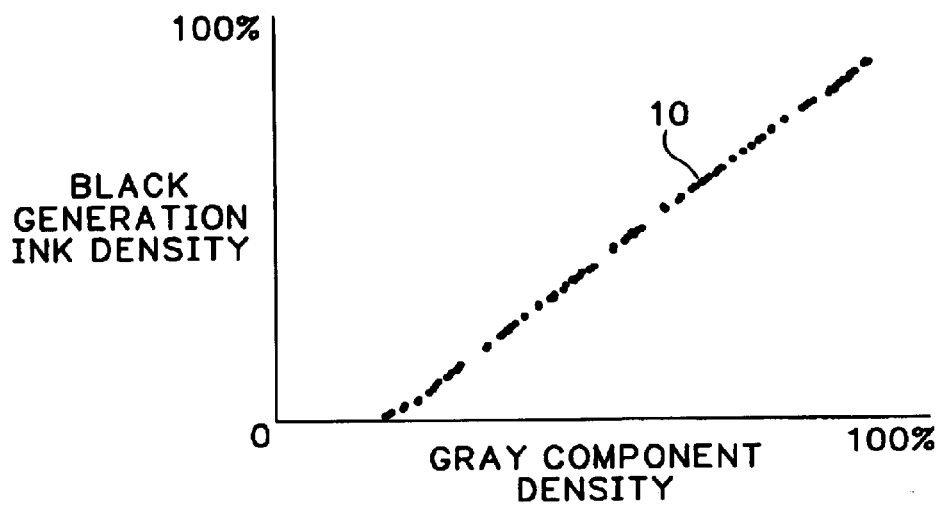
FIG. 1 shows a prior art black generation curve for printed images.

An example of black generation table values, k_generate_table from the equations above, is shown by curve 10 in FIG. 1. As can be seen, the black generation value is essentially zero for lower gray component values. Gray component density is the current gray level expressed as a percentage of the highest gray level attainable. The actual percentage is the gray component density value. For example, a gray component density may have a range of 0 to 255. A gray component value of 50% would be equivalent to 128.

At step 32, the black generation value is determined. If the gray component density is below a first threshold, the black generation will be at 100%. As discussed above, black generation at 100% sets the black value equal to the minimum CMY value. If the gray component density is above a second threshold, the absolute value of black becomes a constant and the black generation process adjusts the other colors accordingly.

In this process, the ability to add any black beyond the highest density of black no longer exists. Therefore, the values of the other colors must be adjusted to provide enough layering of the colors to achieve the proper gray component density for black regions of the image.

After the black generation value is determined, the other colors are rendered. For a four-color process (CMYK), the new values for the other colors are adjusted for the value of black generation in step 34. If a six-color process is used, or other process where there are more than one density of the other color inks, the use of these other densities can be optimized for use with light black ink.

For example, using the values from the above discussion, assume the colors cyan and magenta have full intensity inks and ⅓ intensity, or light, inks. The process can be referred to as CC'MM'YK', where the (') make designates a ⅓ intensity ink. In this example, only light cyan or magenta dots would be used when the gray component density is lower than the first threshold of 25%. High intensity dots would be added after 25%. At 33.33% gray component density, the light color dots would become solid. After the calculations are performed, the processor knows how much of which color at which intensity that pixel requires.

As mentioned previously, no other printing approach uses light black ink. There are several approaches that use light and dark inks for the colors, such as CC'MM'YK. Methods that use dark black ink only produce images where the dark black dots are noticeable at lower levels of gray component density, detracting from image quality. This approach does not suffer from the noticeable black dots.

Thus, although there has been described to this point a particular embodiment for a method for printing color images using light black ink, it is not intended that such specific references be considered as limitations upon the scope of this invention except in-so-far as set forth in the following claims.

What is claimed is:

1. A method for printing images using light black ink, comprising the steps of:

setting a first and second threshold, wherein the first and second thresholds are determined by an intensity value of the light black ink relative to standard black ink;

determining a gray component density value for a pixel;

calculating a black generation value, wherein the black generation value is at one hundred percent if the gray component density is below the first threshold and the absolute value of black is a constant if the gray component density is above the second threshold;

generating values for other colors dependent upon the black generation value.

2. The method of claim 1 wherein the intensity value of the light black ink is ⅓ intensity of standard ink.

3. The method of claim 1 wherein the first threshold is twenty five percent.

4. The method of claim 1 wherein the second threshold is thirty five percent.

5. The method of claim 1 wherein the other colors comprise cyan, magenta and yellow.

6. The method of claim 1 wherein the other colors comprise cyan, light cyan, magenta, light magenta and yellow.

* * * * *

UNITED STATES PATENT AND TRADEMARK OFFICE
CERTIFICATE OF CORRECTION

PATENT NO.      : 6,765,693 B1
APPLICATION NO. : 09/527887
DATED           : July 20, 2004
INVENTOR(S)     : Chang It is certified that error appears in the above-identified patent and that said Letters Patent is hereby corrected as shown below:

Column 3, line 17, insert the following paragraphs --¶ In the above 100% example, black was set to 100% of the lowest value, 10. The value 10 was then subtracted from the remaining colors, in this case C and M. For the 50% example, black was set to 50% of the lowest value, or 5, and 5 was subtracted from the remaining values, including the minimum value Y.¶ This can be expressed as follows, where N is equal to the minimum value of CMY.

$N = Min(C, M, Y);$  $K = k\_generate\_table(N);$ $C = C\text{-ctable}(K);$  $M = M\text{-mtable}(K);$ $Y = Y\text{-ytable}(K).$ The term k_generate_table is a table used to adjust the undercolor removal percentage. This avoids decreasing luminance when black ink takes place of CMY inks, and optimizes the reproduction color gamut. The values ctable, mtable, and ytable adjust the amount of color ink to preserve the correct color chromaticity.--.

Column 3, line 27, insert the following paragraphs --¶ As the gray component density increases, black is generated at a very low percentage. At the maximum gray component density, black is generated at 100%. Black generation at 100% was given as an example above.¶ Use of lighter black ink allows a different black generation table to be used. One example of black generation values in accordance with the invention is shown by curve 20 in Figure 2. Once the gray component density reaches a value near the maximum black ink density, the CMY dots are used for higher levels of gray component density as show by curve 22. Once the maximum black ink density is reached in the gray component curve, the black component becomes a constant at whatever value of black ink intensity that particular ink has.¶ For example, if a black ink of 1/3

Signed and Sealed this

Twenty-fifth Day of May, 2010

Figure 2:
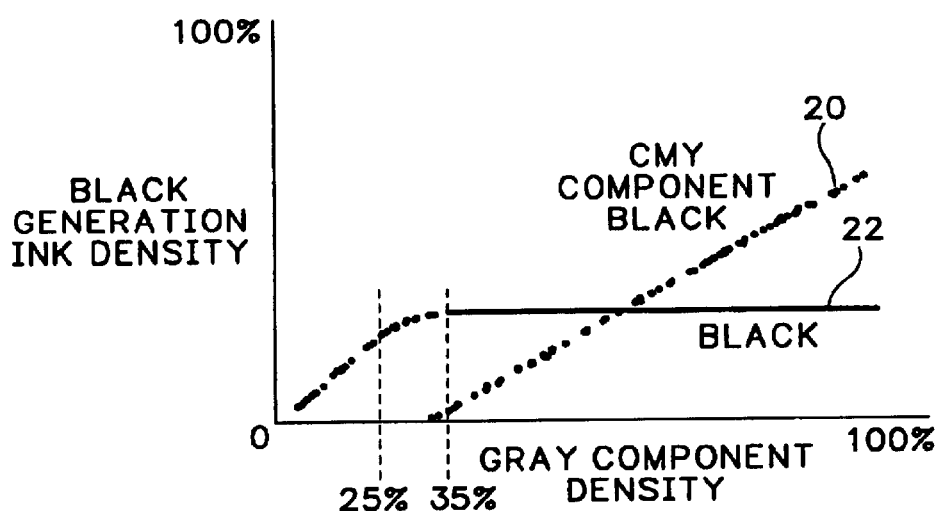
FIG. 2 shows a black generation curve for printed images, in accordance with the invention.
Figure 3:
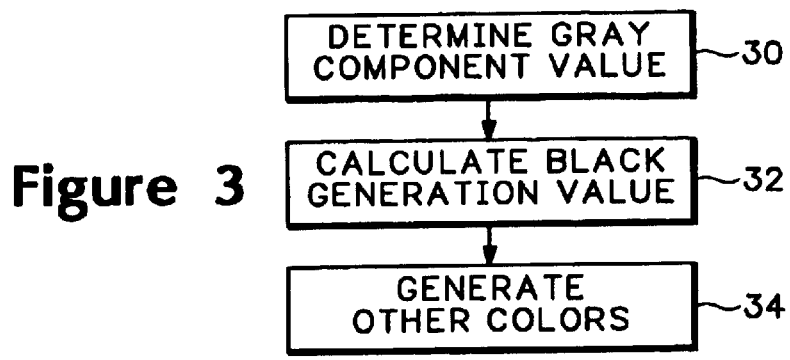
FIG. 3 shows a flow chart for a method of printing with light black ink, in accordance with the invention.

David J. Kappos
*Director of the United States Patent and Trademark Office* the intensity of standard black inks is used, the maximum value of black is 33%. For gray component densities higher than values around 33%, the black component will be a constant. At some point, the CMY dots will be used to generate black in addition to the light black ink.¶ In the example using 1/3 intensity ink, the curve 22 has two thresholds. The first threshold occurs at the point where the CMY dots begin to be used to generate black tones. In Figure 2, this value is at 25% gray component density. The second threshold is the point at which black becomes a constant. In Figure 2, this value is at 35% gray component density. In between these two points, a smooth curve links them. These values are for this example only. Different intensities of ink will result in different thresholds.¶ A flowchart for a general method of this invention is shown in Figure 3. At step 30, the gray component value or density is determined. This is probably a known value at this point in the printing process, as the processor needs this information prior to rendering the image.--.